United States Patent
Mezan

(10) Patent No.: US 9,073,635 B2
(45) Date of Patent: Jul. 7, 2015

(54) ROTORCRAFT YAW PILOTING SYSTEM MAKING USE OF A MEMBER OF THE HUMAN-OPERATED TYPE AND OF A FLIGHT CONTROL GENERATOR OF THE OBJECTIVE TYPE

(71) Applicant: EUROCOPTER, Marignane, Cedex (FR)

(72) Inventor: Serge Mezan, Sausset les Pins (FR)

(73) Assignee: Airbus Helicopters, Marignane Cedex (FR)

( * ) Notice: Subject to any disclaimer, the term of this patent is extended or adjusted under 35 U.S.C. 154(b) by 328 days.

(21) Appl. No.: 13/647,508

(22) Filed: Oct. 9, 2012

(65) Prior Publication Data
US 2013/0327896 A1  Dec. 12, 2013

(30) Foreign Application Priority Data

Oct. 10, 2011 (FR) ...................................... 11 03067

(51) Int. Cl.
*B64C 13/22* (2006.01)
*B64C 13/44* (2006.01)
(Continued)

(52) U.S. Cl.
CPC ................. *B64C 27/78* (2013.01); *B64C 13/44* (2013.01); *B64C 13/22* (2013.01); *G05D 1/0808* (2013.01); *G05D 1/0825* (2013.01)

(58) Field of Classification Search
CPC ........ B64C 13/02; B64C 13/04; B64C 13/12; B64C 13/22; B64C 13/44; B64C 27/56; B64C 27/57; B64C 27/78; B64C 27/82; B64C 2027/8209; G02G 1/00; G02G 1/01; G02G 1/34; G02G 1/0061; G02G 1/06; G02G 1/0669

USPC ................. 244/235, 236, 196, 197, 227, 228, 244/17.21, 220, 221, 234
See application file for complete search history.

(56) References Cited

U.S. PATENT DOCUMENTS 3,332,643 A * 7/1967 Toner ......................... 244/17.21
3,528,633 A   9/1970 Knemeyer
(Continued)

FOREIGN PATENT DOCUMENTS

| FR | 2339920 A1 | 8/1977 |
| FR | 2918348 A1 | 1/2009 |
| WO | 9305460 A1 | 3/1993 |

OTHER PUBLICATIONS

Search report and Written Opinion; Application No. FR 1103067; dated Jul. 2, 2012.

*Primary Examiner* — Tien Dinh
*Assistant Examiner* — Richard R Green
(74) *Attorney, Agent, or Firm* — Brooks Kushman P.C.

(57) ABSTRACT

A system and a method for controlling a rotorcraft (1) in yaw (Y). The control system comprises a plurality of drive channels that operate an anti-torque rotor (4) of the rotorcraft (1). A first drive channel makes use of a rudder bar (13) including a set of pedals operated by the human pilot of the rotorcraft in order to control the anti-torque rotor (4). A second drive channel includes an autopilot. A third drive channel includes objective-type flight control means comprising a movable control member (12) that is operated by the human pilot and that continuously issues control signals (11) relating to a state of progression that the rotorcraft (1) is to achieve. Use of the second drive channel and of the third drive channel depends on inhibit means (19) for inhibiting operation thereof, which means are activatable by detector means (37) for detecting operation of the rudder bar (13).

20 Claims, 1 Drawing Sheet

(51) Int. Cl.
*B64C 27/78* (2006.01)
*G05D 1/08* (2006.01)

(56) References Cited

U.S. PATENT DOCUMENTS

| 4,094,479 | A | | 6/1978 | Kennedy, Jr. | |
|---|---|---|---|---|---|
| 4,206,891 | A | * | 6/1980 | Perez et al. | 244/235 |
| 4,392,203 | A | | 7/1983 | Fischer | |
| 4,492,907 | A | * | 1/1985 | Fabian et al. | 318/586 |
| 4,493,465 | A | * | 1/1985 | Howlett et al. | 244/17.21 |
| 4,527,242 | A | | 7/1985 | McElreath | |
| 4,626,998 | A | * | 12/1986 | Adams et al. | 244/178 |
| 5,076,517 | A | * | 12/1991 | Ferranti et al. | 244/236 |
| 5,213,283 | A | | 5/1993 | Gold | |
| 5,395,077 | A | | 3/1995 | Wolford | |
| 5,428,543 | A | * | 6/1995 | Gold et al. | 244/177 |
| 6,772,054 | B1 | * | 8/2004 | Achache | 244/227 |

* cited by examiner

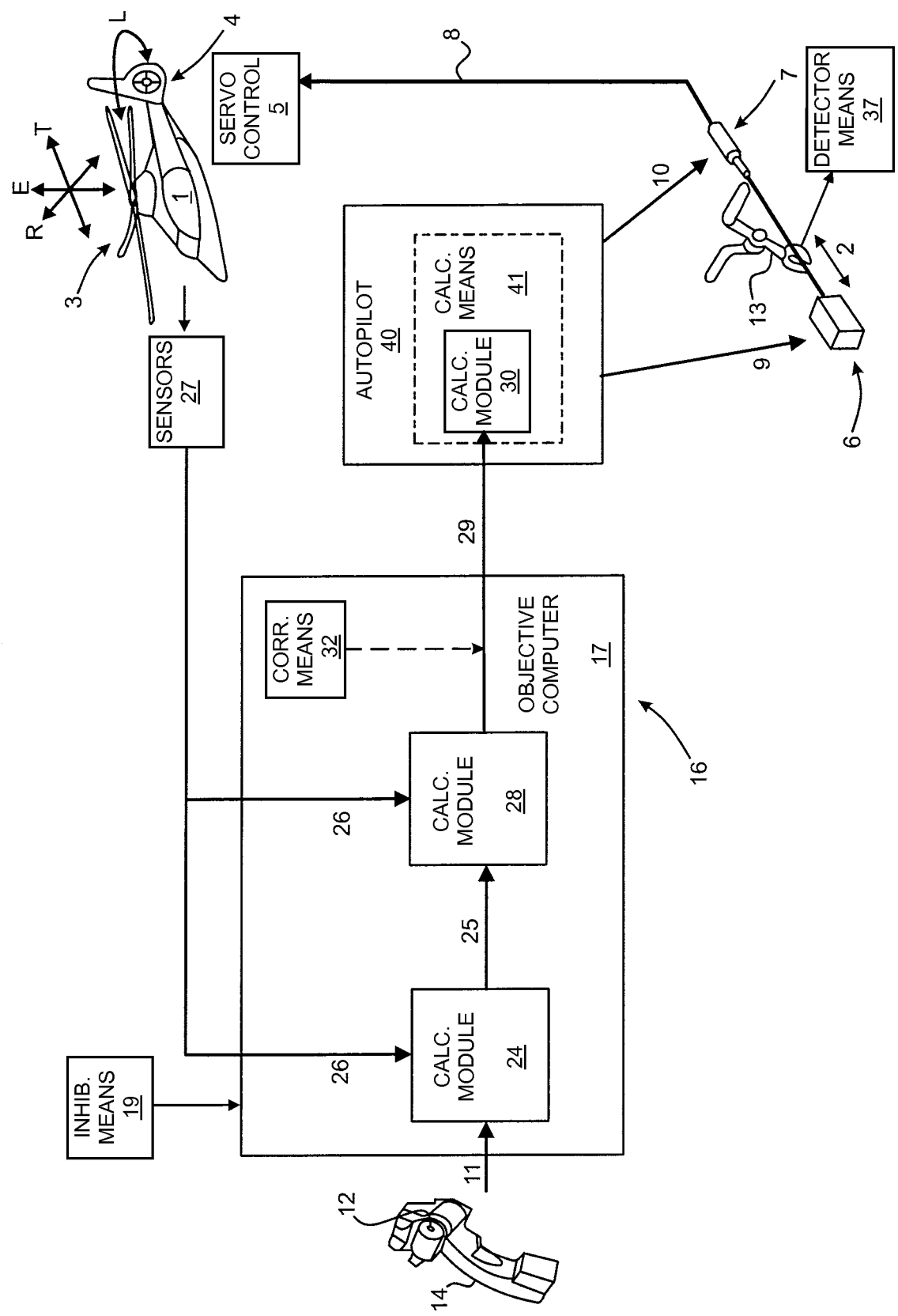

ROTORCRAFT YAW PILOTING SYSTEM MAKING USE OF A MEMBER OF THE HUMAN-OPERATED TYPE AND OF A FLIGHT CONTROL GENERATOR OF THE OBJECTIVE TYPE

CROSS REFERENCE TO RELATED APPLICATIONS

This application claims priority to French patent application No. FR 11 03067 filed on Oct. 10, 2011, the disclosure of which is incorporated in its entirety by reference herein.

BACKGROUND OF THE INVENTION (1) Field of the Invention

The present invention relates to the field of rotary-wing aircraft, and more particularly to control systems for directional piloting in yaw of a rotorcraft, in particular of a helicopter.

The invention provides a yaw flight control system for a rotorcraft that makes use of at least one member of the type operated by a human, in particular a human pilot of the rotorcraft, and of calculation means that operate actuators for acting on an anti-torque rotor of the rotorcraft.

(2) Description of Related Art

Rotorcraft are fitted with rotors, each constituting a rotary wing made up of a plurality of blades, which blades extend radially around a rotary drive axis of the rotary wing. A main rotor having an axis that is substantially vertical relative to the rotorcraft provides the rotorcraft with lift and possibly also with propulsion, and/or enables it to be maneuvered in various directions, in pitching, in roll, and in elevation, in particular. An anti-torque device serves to maneuver the rotorcraft in turning about a yaw axis. Such an anti-torque device is constituted in particular by a rotor having its axis substantially horizontal relative to the rotorcraft. Such a substantially horizontal axis rotor is commonly formed by a tail rotor, or else by a propulsive propeller for a rotorcraft presenting high forward speed and a long range.

The rotorcraft has a plurality of movable control members of the type operated by a human in order to pilot the rotorcraft. The movable control members generate flight controls depending on how they are operated by a human pilot of the rotorcraft, thereby acting on the blades of the rotors in order to modify their pitch, cyclically or collectively.

The movable control members used for acting on the main rotor are conventionally arranged as a member that is operated by the hand of the human pilot of the rotorcraft, such as a stick or a lever hinged to the floor of the rotorcraft, or indeed a "joystick" type stick installed in an armrest of a seat on which the human pilot is sitting.

A movable member for controlling cyclic pitch enables the human pilot to modify the angle of attack of the blades of the main rotor in differential manner, thereby varying the orientation of the rotorcraft in pitching and in roll. A movable member for controlling the collective pitch of the blades of the main rotor enables the human pilot to modify the pitch of all of the blades together, and consequently to vary the lift of the rotary wing, so as to maneuver the rotorcraft in elevation.

The movable control member for enabling the human pilot to act on the anti-torque rotor is traditionally arranged as a rudder bar including a set of pedals. The rudder bar enable the human pilot to vary the angle of attack of all of the blades of the anti-torque rotor together, thereby varying the thrust that it generates at the tail of the rotorcraft. Thrust from the anti-torque rotor thus serves either to perform a yaw maneuver, or else to compensate the yaw torque that is generated by the main rotor, with any variation in the propulsion of the rotorcraft from the main rotor involving concurrent action on of the anti-torque rotor in order to adjust the effect that it produces correspondingly.

In particular embodiments of the movable member for controlling the anti-torque rotor, the rudder bar is replaced by a stick or a joystick hinged to the floor of the rotorcraft or to a pilot's seat.

For example, according to FR 2 918 348 (the State of France), the controls normally operable by the human pilot using the rudder bar is transferred to a stick in order to enable a paraplegic human pilot to control the rotorcraft in yaw without using his or her legs.

Also by way of example, according to U.S. Pat. No. 5,395,077 (Wolford T.), the rudder bar is eliminated and replaced by a control joystick.

Conventionally, movable control members are connected to the rotors via a corresponding drive channel. Such a drive channel comprises in particular a remote mechanical transmission mechanism that is interposed between the movable control member operable by the human pilot and at least one rotor to which the drive channel is allocated. Such remote mechanical transmission mechanisms are commonly made up of connecting rods, links, cables, and/or other analogous remote mechanical transmission members.

The drive channel is preferably fitted with a servo-control that provides accurate control over the operation of the rotors and/or that serves to amplify the power of the flight commands that are transmitted via the drive channel. A flight command transmitted to that servo-control is logically compared with the state of the blades of the rotor in order to detect an error, and the difference value obtained by the comparison is amplified and used to correct the detected error.

In order to improve the comfort of the human pilot, movable control members have been proposed that generate electrical signals that are processed by an intermediate computer in order to operate the servo-controls forming part of the drive channel. A flight command issued by the human pilot by operating the movable control member is not transmitted mechanically to the corresponding rotor via the remote mechanical transmission mechanism allocated thereto, but instead generates electrical signals. These electrical signals are taken into account by the intermediate computer, which then transmits activation commands to a servo-control in order to operate it. Operation of the servo-control causes the pitch of the blades to be varied by means of a mechanical transmission mechanism.

It is also common for rotorcraft to be fitted with an autopilot that, where necessary, can act in substitution for the movable control members of the type operated by a human. The autopilot is activated on the basis of an execution order issued by a human pilot by means of a movable control member of the type operated by a human, such as a control button or an analogous control member.

In a function of keeping to a reference, the autopilot operates the drive channel as a function of a reference flight setpoint. The reference flight setpoint is previously issued by the human pilot or is determined by the autopilot on the basis of observation information about a state of progression of the rotorcraft. Activating the autopilot causes the progression of the rotorcraft to be maintained relative to observation information evaluated at the time of that activation.

More particularly, the autopilot makes use of calculation means that generate orders automatically for using actuators allocated to operating the rotors. The autopilot comprises computers that implement piloting relationships for operating the rotors in order to maintain controlled progression of the rotorcraft in the absence of the human pilot issuing flight commands via movable control members of the type operated by a human.

In the reference-keeping function provided by the autopilot, a state of progression of the rotorcraft is maintained by the autopilot acting on the use of the actuators by making a comparison between the reference flight setpoints and the actual state of progression of the rotorcraft. The reference flight setpoint is unchanging information to which the autopilot refers in order continuously to correct the state of progression of the rotorcraft. Such a correction is controlled by the autopilot as a function of the actual state of progression of the rotorcraft as established on the basis of said observation information delivered by various measurement and calculation means with which the rotorcraft is fitted.

The actuators are commonly electrically powered or preferably hydraulically powered since hydraulic power is considered to be more reactive. The actuators are commonly referred to respectively as a "trim" actuator and as a "series" actuator.

The trim actuator is a bidirectional member that is placed in the drive channel in parallel with the rudder bar in order to transmit a flight command to the rotor via the drive channel. The trim actuator serves to operate the drive channel in substitution for the movable control member. The series actuator is a bidirectional member that is placed in series in the drive channel and that is used in particular for stabilizing the operation of the rotor.

The autopilot generates activation commands for activating the series actuator in order to act on the behavior of the rotor. The trim actuator is suitable for being activated in order to recenter the series actuator and in order to remedy the reduced authority of the series actuator. Various automatic flight control system architectures have been proposed.

For example, according to EP 0 296 951 (Aerospatiale), information from a plurality of movable control members of an aircraft is combined and processed by a computer in order to provide joint control of roll and yaw flight maneuvers.

Document FR 2 339 920 (Sperry Rand Corp.) describes an aircraft control system incorporating a system for increasing the stability of the aircraft and for performing yaw flight maneuvers.

More particularly, documents WO 93/05460 (United Tech. Corp.) and WO 93/05460 (United Tech. Corp.) describe rotorcraft flight control systems including means for automatically adapting flight commands in order to maneuver the rotorcraft in yaw.

The technological background close to the present invention can also be discovered by reference to documents U.S. Pat. No. 3,528,633 (Knemeyer S.), U.S. Pat. No. 4,392,203 (Fischer W. C. et al.), and U.S. Pat. No. 4,527,242 (McElreath K. W.) which describe various rotorcraft yaw flight control devices having calculation means incorporated in an autopilot of a rotorcraft.

More specifically, in the field of aviation, objective-type flight control systems are known. Movable flight control members operated by a human pilot are used to generate electrical signals that correspond to objective-type flight commands relating to a state of progression that the airplane is to achieve. Objective-type flight commands are transmitted continuously to an objective computer that determines how to use actuators so as to modify the state of progression of the aircraft. The objective computer generally controls orders for activating actuators by comparing the objective-type flight controls issued by the human pilot and observation information about an actual state of progression of the aircraft.

For rotorcraft, it is sometimes found in practice that there are drawbacks relating to yaw piloting via the rudder bar.

For example, in manual piloting mode, for a position of the rudder bar determined by the human pilot, the turning rate imparted to the rotorcraft about the yaw axis is not constant because of the influence of the external environment and in particular because of wind conditions. Consequently, the human pilot needs to adapt variations in the yaw maneuvering of the rotorcraft dynamically and to correct the turning of the rotorcraft depending on the rate of turn that is actually obtained.

As another example, in manual piloting mode, the entire drive channel connecting the rudder bar to the anti-torque rotor is made up of mechanical members that are subject to friction. Clearances and inaccuracies in the movement of the moving mechanical members making up the mechanical drive channel are inevitable, to the detriment of the "feel" perceived by the human pilot and to the detriment of the pertinence of the flight commands transmitted to the anti-torque rotor.

It is also observed in automatic piloting mode that the human pilot may act unintentionally on the rudder bar, e.g. because the pilot may take up a poor posture in the cockpit and/or because it is difficult for the human pilot to sense small movements of the rudder bar through feet wearing boots used by the human pilot to move the pedals of the rudder bar. The human pilot may unintentionally oppose the action of the actuators on the drive channel, such as movement of the trim actuator used for recentering the series actuator. The series actuator may become saturated, thereby leading to a loss of stabilization of the rotorcraft.

In an automatic piloting configuration of the rotorcraft, action by the human pilot on the rudder bar leads to the reference-keeping function of the autopilot being interrupted so as to allow the human pilot to act directly on the rotorcraft. The reference-keeping function performed by the autopilot can thus be stopped unintentionally by the human pilot, and without the human pilot being immediately aware that this has happened.

BRIEF SUMMARY OF THE INVENTION

The object of the present invention is to provide a yaw flight control system for a rotorcraft and a method making use of the system that improves the interface between the human pilot and the yaw flight control system in order to remedy the drawbacks mentioned above.

The flight control system of the present invention is a yaw flight control system for a rotorcraft having an anti-torque rotor.

The control system comprises at least one drive channel including a movable control member of the type operated by a human, in particular a human pilot of the rotorcraft. The control system also comprises transmission means that are interposed between the movable control member and the anti-torque rotor for conveying a flight command as generated by the movable control member to the anti-torque rotor in order to operate it. The operation of the anti-torque rotor corresponds in particular to varying the collective pitch of blades that it includes. The transmission means implement in particular a remote mechanical force transmission mechanism that preferably includes one or more servo-controls.

Calculation means may be used to cause one or more actuators to be activated, thereby operating the mechanical transmission mechanism. Such actuators may be constituted equally well by a trim actuator and/or by a series actuator, as described above.

In particular, the calculation means are means for processing a flight command issued in the form of an electrical signal. For example, an autopilot incorporates such calculation means for delivering a reference-keeping function, with these calculation means being put into operation by a specific control member operated by the human pilot of the rotorcraft. Such a specific control member is arranged for example as a control button or an analogous control member that can be actuated by the human pilot of the rotorcraft.

More particularly, in general terms, the control system of the present invention comprises:

At least one first drive channel making use of a rudder bar including a set of pedals operated by a human pilot. The rudder bar is in communication with the anti-torque rotor via a remote mechanical transmission mechanism that is suitable for varying the collective pitch of blades forming part of the anti-torque rotor. The rudder bar generates a mechanical flight command that is transmitted to the anti-torque rotor via the remote mechanical transmission mechanism, which preferably includes at least one servo-control;

At least one second drive channel including calculation means with use thereof depending on a control button that can be actuated by a human pilot. Such a control button transmits to the calculation means electrical signals relating to an order for keeping to a reference setpoint. By way of example, information modifying the order for keeping to the reference setpoint as delivered by the control button may constitute changing a previous reference setpoint by incrementing it. The calculation means are used by an autopilot device and cause activation of at least one actuator for acting on the remote mechanical transmission mechanism. Such actuators may be constituted in particular equally well by a trim actuator placed in the drive channel in parallel with the rudder bar, and/or by a series actuator inserted in the remote mechanical transmission mechanism. The actuators cause said remote transmission mechanism to be used in substitution for the first drive channel. It should be observed that a said trim actuator and a said series actuator may be combined within a common active member forming part of the remote mechanical transmission mechanism. Furthermore, the above-described ways used by the autopilot to acquire the reference setpoint are given by way of example, and it is possible for the autopilot to make use of other ways of acquiring and processing said reference setpoint.

Inhibit means for inhibiting operation of the second drive channel, at least in part. Use of the inhibit means depends on means for detecting the rudder bar being moved by a person, in particular a human pilot. Such movement of the rudder bar generates forces that are easily detectable, e.g. by force sensors with activation of the inhibit means depending thereon. The second drive channel is inhibited in particular as regards a function of keeping to a reference setpoint.

According to the present invention, the control system is mainly recognizable in that it includes a third drive channel incorporating objective-type piloting means. The use of objective-type piloting means depends on a specific movable control member of the type operated by a person, in particular a human pilot of the rotorcraft. The movable control member issues a control signal on being operated by the human pilot. The control signal is sent to an objective computer that generates a yaw command order relating to a state of progression that is to be achieved by the rotorcraft, and that sends the order to the calculation means of the second drive channel. The command order is used by the calculation means of the second drive channel to activate at least one of the actuators and to vary the collective pitch of the anti-torque rotor as a function of the control signal issued by the movable control member and as a function of a state of progression that the rotorcraft is to achieve, as defined by the objective computer.

Use of the third drive channel depends on the inhibit means, action by the human pilot on the rudder bar deactivating use of the third drive channel. The human pilot is given priority over the use of the first drive channel for operating the blades of the anti-torque rotor.

The human pilot has the option of moving the feet away from the pedals of the rubber bar by using the third drive channel to control the blades of the anti-torque rotor. Said priority may be obtained by means of the human pilot performing a deliberate movement, whereby the pilot puts his or her feet back on the pedals of the rudder bar, should that be necessary. Unintentional deactivation of use of the second or third drive channel is avoided.

The control signal is constituted in particular by an electrical signal that is issued continuously on the basis of the human pilot operating the movable control member in uninterrupted manner. The control signal is proportional to the position of the movable control member relative to a predefined rest station.

The objective-type piloting means are electromechanical means making use of electrical control signals that are issued by the movable control member and that correspond to objective-type flight controls relating to a state of progression that the rotorcraft is to achieve. The term "state of progression of the rotorcraft" is used to designate its behavior as regards its forward speed and/or the direction in which it is progressing in three dimensions, its flight envelope, and/or a stage of flight. The concepts of flight envelope and stage of flight correspond to a state of progression of the rotorcraft in an operating range specific to the rotorcraft, and these concepts are widely accepted. By way of example, a said state of progression of the rotorcraft is for example a hovering state of progression, a low speed state of progression, and/or a cruising flight state of progression.

In order to control flight in yaw, the state of progression that the rotorcraft is to achieve may, for example, relate to an angular rate of turn of the rotorcraft about the yaw axis, to a yawing relative to the ground, and/or to a lateral load factor applied to the rotorcraft.

The control signal issued by the movable control member corresponds to identifying a position of the movable control member relative to a predetermined rest station. In the rest station, the movable control member is not being operated by the human pilot. The control signal is an electrical signal issued as a result of the movable control member being moved by a person, in particular the human pilot of the rotorcraft. The control signal is sent continuously to the calculation means forming part of the second drive channel in order to activate operation of the actuators.

The control signal that is issued corresponds to an objective-type flight command, and is a control signal that is continuous and proportional to the position of the movable control member relative to the rest station. The control signal is issued over a duration and varies for a given amount of uninterrupted movement imparted to the movable control member by a person, the human pilot of the rotorcraft in particular.

Objective-type flight control is constituted in particular by digital or analog information derived from the control signal. It is equally possible for the control signal to be generated discretely or continuously.

The control signal varies in proportion with variation in the position to which the movement control member is moved relative to the rest station. Variation in the movement of the movable control member by the human pilot may be interrupted after said pilot has positioned and held the movable control member in a stable position in which a control signal relating to an objective-type flight command desired by the human pilot is sent continuously to the objective computer.

Operation of actuators in compliance with the state of progression that the rotorcraft is to achieve on the basis of command orders generated by the objective computers is conditional in particular on control signals being delivered continuously and proportionally relating to flight controls operated by the human pilot by continuously moving the movable control member.

The objective computer generates command orders that cause the actuators to be activated, e.g. on the basis of a comparison between the control signals relating to an objective-type flight command and an actual state of progression of the rotorcraft as determined from observation information. The command orders are derived from said comparison and cause at least one actuator to be activated via calculation means forming part of the second drive channel.

The activation commands use actuators that operate the anti-torque rotor via mechanical transmission means interposed between the actuators and the anti-torque rotor. Operating the anti-torque rotor may serve more particularly to vary the value of the collective pitch of the blades of the rotary wing constituting the rotor, in order to vary the progression of the rotorcraft in yaw.

The observation information are delivered in particular by means for detecting the progression of the rotorcraft and/or the state of its surrounding environment, such as measurement means and/or calculation means suitable at a given instant for evaluating the surrounding conditions and/or the flight conditions and the progression conditions of the rotorcraft.

The observation information are generated in particular on the basis of various detector members commonly to be found in a rotorcraft. As non-limiting examples, such detector members comprise at least a free gyro, an inertial unit, an anemometer, a rate gyro, a magnetometer, a satellite global positioning system (GPS) or an analogous satellite positioning device, and/or indeed a Doppler effect device.

The rudder bar and the movable control member are moved by the human pilot independently of each other. In order to avoid conflict between flight commands that might be issued simultaneously respectively by the rudder bar and by the movable control member, the control system includes said inhibit means, with use thereof depending on means for detecting action by the human pilot on the rudder bar and in particular detecting movement of the rudder bar by the human pilot resulting equally well from the rudder bar being moved or from the rudder bar being held in a position by force. In a simple embodiment, such detector means may comprise a member for detecting forces transmitted to the drive channel and/or a sensor for sensing the position of the rudder bar.

The comfort of the human pilot and the reliability of procedures for operating actuators are improved by making use of the third drive channel in substitution for the first drive channel and at the request of the human pilot. The human pilot does not need to know the actual variation in the value of the collective pitch of the blades of the rotary wing constituting the anti-torque rotor, since action by the pilot on the movable control member for causing the rotorcraft to be maneuvered in yaw is based on objective-type flight commands. The human pilot also does not need to take account of the environment outside the rotorcraft, such as wind conditions for example, when acting on the state of progression that the rotorcraft is to achieve by moving the movable control member.

The rudder bar may be used by the human pilot, when necessary, under certain difficult piloting conditions, such as the rotorcraft being in difficult surroundings and/or in a difficult flight situation and/or in the event of calculation means failing. Under difficult flight conditions, the human pilot has the first drive channel available for controlling the anti-torque rotor and for controlling the flight of the rotorcraft in yaw by using the rudder bar.

Since the human pilot has the third drive channel available in addition to the first drive channel, yaw flight control of the rotorcraft is comfortable and made reliable by using the third drive channel. Yaw flight control of the rotorcraft is made safe in the face of possible random and unintentional actions of the human pilot on the rudder bar, with use of the rudder bar being subjected to intentional action on the part of the human pilot. When the human pilot makes use of the third drive channel, the pilot should move his or her feet away from the pedals of the rudder bar.

In autopilot mode, the human pilot may move the feet away from the pedals of the rudder bar while making use, if necessary, of the movable control member for intervening manually on the yaw piloting of the rotorcraft. The human pilot taking up a posture in which the feet are kept away from the rudder bar avoids deactivating the reference-keeping function of an autopilot of the rotorcraft, where appropriate.

In an advantageous embodiment, the movable control member is operated by hand, being incorporated in a control stick. More particularly, the movable control member is arranged as a button with at least unidirectional mobility for issuing the control signal. Preferably, the control stick is a collective pitch varying control stick for use with a main rotor of the rotorcraft.

So far as the human pilot is concerned, comfort in yaw piloting of the rotorcraft is advantageously improved by arranging the movable control member as a unidirectionally mobile button that is comfortable for the human pilot to move, e.g. with a thumb. The movable control member acts in particular to issue at least one electrical control signal, or analogously an optical signal, that may equally well be of the digital type or of the analog type, and that relates to an objective-type flight setpoint.

For example the movable control member is arranged as a rotary knob, a slider, a coolie hat button, or an omnidirectional ball. The movable control member generates an electrical signal, preferably being associated with means for measuring the amplitude through which the human pilot has moved it, which means may equally well be based on measuring forces and/or deflections. Such a button may advantageously be installed on a control stick for controlling a main rotor of the rotorcraft, in particular a control stick for varying the collective pitch of the blades of the rotary wing of the main rotor.

The objective-type piloting means include more particularly means for processing the control signal issued by the human pilot moving the movable control member. The control signal corresponds to an electrical signal concerning an objective-type flight command, e.g. relating equally well to information about rate of turn in yaw or to information about a lateral load factor, or to information about yawing relative to the ground.

The objective computer generates a command order on the basis of a comparison between the control signals relating to an objective-type flight command and to an actual state of progression of the rotorcraft. The command orders derived from said comparison give rise to activation commands for activating the actuator via calculation means included in the second drive channel.

The objective computer includes means for recentering the "series" actuator by continuously controlling the activation of the "trim" actuator independently of the human pilot operating the movable control member to generate any control signal.

In an embodiment of the objective computer, it comprises in particular:

a first calculation module in communication with the movable control member and serving to generate a setpoint signal on the basis of a control signal issued by the movable control member. The setpoint signal is in particular weighted by observation information about a stage of flight of the rotorcraft, such as a hovering state of progression, a low speed state of progression, and/or a cruising speed state of progression. The reference signal is delivered depending on the flight envelope of the rotorcraft, typically such as a hovering flight situation or a cruising flight situation. By way of example, the flight envelope may be taken into account at low speeds in order to generate a rate of turn in yaw for the rotorcraft; and a second calculation module that is in communication with the first module and that generates a command order. The command order is derived from processing the difference between the setpoint signal and observation information about a change in the state of progression of the rotorcraft. The second module is dedicated to servo-controlling the state of progression of the rotorcraft on the previously-weighted setpoint signals that are derived from the first module.

The objective computer is in communication with a third calculation module forming part of the second drive channel, and more particularly the calculation means of the autopilot. The third module generates at least one activation command for activating the actuator on the basis of at least one command order generated by the second module.

The present invention also provides a method of controlling the flight control of a rotorcraft in yaw, based on using a control system as described above. The control method of the present invention is mainly recognizable in that it comprises the following operations:

Sending to an objective computer a control signal that is delivered continuously by the human pilot of the rotorcraft operating the movable control member. The control signal relates to an objective-type flight command corresponding to a state of progression that the rotorcraft is to achieve. The control signal is proportional to the position of the movable control member relative to a neutral position corresponding to a predefined rest position.

At least one suitable sensor with which the rotorcraft is fitted detecting observation information about an actual state of progression of the rotorcraft.

The objective computer deducing at least one command order by comparing the control signal and the observation information.

On the basis of the command order, the calculation means of the second drive channel generating an activation command for activating at least one of the actuators.

The calculation means of the second drive channel sending the activation command to at least one corresponding actuator in order to operate the anti-torque rotor so as to cause the rotorcraft to pass from its actual state of progression to the state of progression that is to be achieved.

BRIEF DESCRIPTION OF THE SEVERAL
VIEWS OF THE DRAWINGS

The present invention is described with reference to the sole FIGURE of the accompanying sheet of drawings, which is a diagram of a yaw flight control system for a rotorcraft according to an embodiment of the present invention.

DETAILED DESCRIPTION OF THE INVENTION

In FIG. 1, a rotorcraft 1 has a main rotor 3 and an anti-torque tail rotor 4, each comprising a rotary wing having blades. A pilot of the rotorcraft can control the blades of the main rotor 3 in order to change the state of progression of the rotorcraft 1 relative to corresponding flight orientations, in particular in pitching P, in roll R, and in elevation E. By controlling the blades of the tail rotor 4, the pilot changes the state of progression of the rotorcraft 1 in yaw Y. The pilot of the rotorcraft may be a human pilot or an autopilot.

The pitch of the blades of the tail rotor 4 is varied by means of a servo-control 5 by using a yaw flight control system forming part of the rotorcraft 1. The servo-control 5 is placed on a mechanism 8 for transmitting mechanical forces. Operation of the mechanical transmission mechanism 8 depends on a set of pedals of a rudder bar 13 and on actuators 6 and 7. Such actuators are constituted in particular by a trim actuator 6 that is placed in parallel with the rudder bar 13 and by a series actuator 7. Traditionally, the transmission mechanism 8 comprises remote mechanical transmission members that may be arranged as connecting rods or the like. The tail rotor 4 is controlled via drive channels that are distinct and independent concerning their own operation.

A first drive channel is a conventional mechanical drive train that makes use of the rudder bar 13 and the transmission mechanism 8. The rudder bar 13 constitute a movable control member of the type that is operated by the legs of a human pilot and it issues mechanical flight controls 2 that are transmitted to the servo-control 5 via the transmission mechanism 8.

A second drive channel is an electronic drive channel that is used by an autopilot 40 that comprises calculation means 41. The autopilot 40 makes it possible in particular to provide a function of keeping to a reference setpoint. The autopilot 40 is activated in substitution for the first drive channel.

A third drive channel is used in substitution for the first drive channel and the second drive channel. The third drive channel enables the human pilot of the rotorcraft to control the rotorcraft on the basis of objective-type flight commands issued by means of a movable control member 12 of the type that is moved by a human pilot.

The movable control member 12 issues objective-type flight commands in the form of electrical control signals 11. The movable control member 12 is operated by the human pilot more particularly by means of a thumb, since it is arranged as a button installed on a control stick 14. Such a control stick 14 is in particular a stick for controlling variation of the collective pitch of the blades constituting the rotary wing of the main rotor 3. This control stick 14 is advantageously installed as a joystick on a pilot's seat.

The third drive channel makes use of objective-type piloting means 16 comprising an objective computer 17 that communicates with the calculation means 41 of the autopilot 40. The objective computer is suitable for processing the control signals 11 issued by the movable control member 12 and for generating command orders 29 that are transmitted to the calculation means 41 in order to activate the actuators 6, 7. On the basis of command orders, the calculation means generate activation commands 9, 10 and transmit them to the actuators 6, 7. Activating the actuators serves to control the tail rotor 4 via the transmission means 8 in substitution for use of the rudder bar 13 by the human pilot and for the function of keeping to a reference setpoint as performed by the autopilot 40.

Inhibit means 19 for inhibiting use of the second drive channel and the third drive channel are activated by detector means 37 for detecting operation of the rudder bar 13 by the human pilot. Such detector means 37 may be constituted for example by force sensors 37 placed on the transmission mechanism 8. The inhibit means 19 avoid potential conflict between differing flight commands being issued respectively by the rudder bar 13 and by the movable control member 12. The inhibit means 37 are essentially dedicated to allowing the rotorcraft to be controlled on a priority basis by means of the rudder bar 13 acting via the first drive channel.

The objective computer 17 has a first calculation module 24 for processing the control signal 11 that is issued continuously by the movable control member 12. The first module 24 generates a setpoint signal 25 on the basis of the control signal 11, which is weighted by observation information 26 relating to a stage of flight of the rotorcraft 1. The observation information 26 is provided by one or more appropriate sensors 27 with which the rotorcraft 1 is fitted.

A piloting model converts the control signal 11 into information relating to a state of progression that the rotorcraft is to achieve with respect to its yaw control Y. The piloting model serves to evaluate the amplitude and the dynamic behavior of the variation in the control signal 11, which signal is delivered continuously on the basis of the human pilot operating the manual control member 12. Such a piloting model is typically in the form of data transfer of degree "n", in which sensitivity under steady conditions is defined by a gain on the basis of a ratio between a rate of turn setpoint and a deflection of the movable control member 12.

The setpoint signal 25 is transited to a second calculation module 28 that is dedicated to servo-controlling the setpoint signal 25 relative to setpoints for providing stabilization and/or coordination between changes of direction of the rotorcraft 1. The second module 28 receives observation information 26 relating to an actual state of progression of the rotorcraft 1, and it generates a command order 29.

The command order 29 is transmitted to a third calculation module 30 included in the calculation means 41 of the autopilot 40. The third calculation module 30 generates activation commands 9, 10 for activating the actuators 6, 7.

The sensors 27 fitted to the rotorcraft 1 measure the actual rate of turn in yaw and deliver observation information 26 to the first calculation module 24 and/or to the second calculation module 28. A piloting error, if any, is evaluated by comparison between the control signal 11 and the observation information 26. First correction means 32, such as means of the proportional integral derivative (PID) type determine a yaw Y command order 29 by servo-controlling any piloting error to a zero value.

What is claimed is:

1. A flight control system for yaw (Y) control of a rotorcraft having an anti-torque rotor, the control system comprising:
   at least one first drive channel making use of a rudder bar including a set of pedals operated by a human pilot and in communication with the anti-torque rotor via a remote mechanical transmission mechanism suitable for varying the collective pitch of blades forming part of the anti-torque rotor;
   at least one second drive channel including calculation means with use thereof depending on a control button that can be actuated by a human pilot, the calculation means cause activation of at least one actuator for acting on the remote mechanical transmission mechanism, the actuator being at least one of a trim actuator and a series actuator for acting on the remote mechanical transmission mechanism in substitution for the first drive channel; and
   inhibit means for inhibiting the second drive channel, with use thereof depending on detector means for detecting operation of the rudder bar being moved by the human pilot;
   wherein the control system includes a third drive channel incorporating objective piloting means with use thereof depending on a movable control member operated by a human pilot, the movable control member issuing a control signal to an objective computer that generates a yaw command order relating to a state of progression to be achieved by the rotorcraft which order is sent to the calculation means of the second drive channel.

2. A control system according to claim 1, wherein use of the third drive channel depends on the inhibit means, action by the human pilot on the rudder bar deactivating use of the third drive channel.

3. A control system according to claim 1, wherein the control signal is an electrical signal issued continuously on the basis of a human pilot operating the movable control member without interruption, the control signal being proportional to the position of the movable control member relative to a predetermined rest station.

4. A control system according to claim 1, wherein the movable control member is operated by hand, being incorporated in a control stick.

5. A control system according to claim 4, wherein the movable control member is arranged as a button with unidirectional mobility for issuing the control signal.

6. A control system according to claim 4, wherein the control stick is a collective pitch varying control stick for use with a main rotor of the rotorcraft.

7. A control system according to claim 1, wherein the control signal relates to one of information about a rate of turn in yaw (Y) or information about a lateral load factor or information about yawing relative to the ground.

8. A control system according to claim 1, wherein the objective computer generates a command order on the basis of a comparison between the control signals relating to an objective flight control and an actual state of progression of the rotorcraft, and wherein the calculation means of the second drive channel generates activation commands for activating the actuator in response to the command order.

9. A control system according to claim 1, wherein the at least one actuator of the second drive channel is a "series" actuator, and wherein the objective computer includes means for recentering the "series" actuator by continuously controlling the 1 activation of a "trim" actuator independently of the human pilot operating the movable control member to generate any control signal.

10. A control system according to claim 1, wherein the objective computer comprises:
    a first calculation module in communication with the movable control member and serving to generate a setpoint signal on the basis of a control signal issued by the movable control member, the setpoint signal being weighted by observation information about a stage of flight of the rotorcraft; and
    a second calculation module that is in communication with the first module and that generates a command order derived from processing the difference between the setpoint signal and observation information about a change in the state of progression of the rotorcraft.

11. A control system according to claim 10, wherein the objective computer is in communication with a third calculation module that generates at least one activation command for activating the actuator on the basis of at least one command order generated by the second module.

12. A method of controlling the flight of a rotorcraft in yaw (Y) by using a control system according to claim 1, wherein the method comprises the following operations:
sending to an objective computer a control signal that is delivered continuously by the human pilot operating the movable control member, the control signal relating to an objective flight command corresponding to a state of progression that the rotorcraft is to achieve;
at least one sensor with which the rotorcraft is fitted detecting observation information about an actual state of progression of the rotorcraft;
the objective computer deducing at least one command order by comparing the control signal and the observation information;
on the basis of the command order, the calculation means of the second drive channel generating an activation command for activating at least one of the actuators; and
the calculation means of the second drive channel sending the activation command to the at least one of the actuators in order to operate the anti-torque rotor so as to cause the rotorcraft to pass from its actual state of progression to the state of progression that is to be achieved.

13. A flight control system for a rotorcraft with an anti-torque rotor, the flight control system comprising:
a rudder bar with a set of pedals operable by a pilot;
a mechanical transmission system configured to vary a collective pitch of blades of an anti-torque rotor in response to pilot operation of the pedals;
an actuator configured to act on the mechanical transmission system;
an autopilot control button;
an autopilot system including a processor configured to control the actuator in the absence of pilot operation of the pedals, the autopilot system being activated in response to a pilot actuation of the autopilot control button;
an inhibitor configured to, in response to pilot operation of the pedals, inhibit autopilot system control of the actuator;
a control member; and
an objective computer in communication with the processor and configured to, in response to pilot operation of the control member, generate a yaw command and command the autopilot system to control the actuator based on the yaw command.

14. The flight control system of claim 13, wherein the inhibitor is further configured to inhibit objective computer control of the actuator.

15. The flight control system of claim 13, further comprising a sensor, wherein the control member has a rest position, the sensor is configured to provide an electric control signal proportional to a position of the control member relative to the rest position.

16. The flight control system of claim 13, further comprising a flight control stick, wherein the control member is incorporated into the flight control stick.

17. The flight control system of claim 16, wherein the control member includes a button arranged for unidirectional travel.

18. The flight control system of claim 16, wherein the flight control stick includes a collective pitch varying control stick for use with a main rotor of the rotorcraft.

19. The flight control system of claim 13, wherein the actuator includes at least one of a trim actuator and a series actuator.

20. A rotorcraft comprising:
an anti-torque rotor including a plurality of blades;
a rudder bar with a set of pedals operable by a pilot;
a mechanical transmission system configured to vary a collective pitch of the plurality of blades in response to pilot operation of the pedals;
an actuator configured to act on the mechanical transmission system;
an autopilot control button;
an autopilot system including a processor configured to control the actuator in the absence of pilot operation of the pedals, the autopilot system being activated in response to a pilot actuation of the autopilot control button;
an inhibitor configured to, in response to pilot operation of the pedals, inhibit autopilot system control of the actuator;
a control member; and
an objective computer in communication with the processor and configured to, in response to pilot operation of the control member, command the autopilot system to control the actuator to vary the collective pitch of the plurality of blades.

* * * * *